United States Patent
Kitagawa (12)

(10) Patent No.: US 11,981,271 B2
(45) Date of Patent: May 14, 2024

(54) VEHICLE BODY SOUNDPROOF STRUCTURE

(71) Applicant: HONDA MOTOR CO., LTD., Tokyo (JP)

(72) Inventor: Toshio Kitagawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 178 days.

(21) Appl. No.: 17/669,368

(22) Filed: Feb. 11, 2022

(65) Prior Publication Data

US 2022/0332264 A1 Oct. 20, 2022

(30) Foreign Application Priority Data

Mar. 29, 2021 (CN) .......................... 202110334735.8

(51) Int. Cl.
 *B60R 13/08* (2006.01)
 *B60J 1/10* (2006.01)
(52) U.S. Cl.
 CPC .............. *B60R 13/0815* (2013.01); *B60J 1/10* (2013.01)
(58) Field of Classification Search
 CPC ..... B60N 2/01508; B60R 13/00; B60R 13/01; B60R 21/04; B60R 13/0815; B60J 10/50; B60J 1/10
 USPC ...................................................... 296/146.2
 See application file for complete search history.

(56) References Cited

U.S. PATENT DOCUMENTS

| | | | | |
|---|---|---|---|---|
| 1,991,832 A | * | 2/1935 | Zand | B64C 1/1492 52/204.597 |
| 5,306,156 A | * | 4/1994 | Gibbs | H01R 13/639 224/315 |
| 5,846,463 A | * | 12/1998 | Keeney | B60J 10/78 264/261 |
| 6,327,954 B1 | * | 12/2001 | Medlin | F41H 5/263 89/36.02 |
| 7,328,918 B2 | * | 2/2008 | Hirotani | B60R 22/023 297/483 |

(Continued)

FOREIGN PATENT DOCUMENTS

| | | |
|---|---|---|
| JP | S6050052 U | 4/1985 |
| JP | S62163118 U | 10/1987 |

(Continued)

OTHER PUBLICATIONS

Notification of Reasons for Refusal issued in the JP Patent Application No. JP2022-014051, mailed on Jul. 4, 2023.

*Primary Examiner* — Lori Lyjak
(74) *Attorney, Agent, or Firm* — CKC & Partners Co., LLC

(57) ABSTRACT

The present invention provides a vehicle body soundproof structure Sp that is configured to block noise from outside a vehicle, and comprises a window panel 24 fixed in a window frame 22 located on a side portion of a vehicle body 10, an interior material 50 provided at a vehicle interior side of the window frame 22 and having an upper end portion 52 extending diagonally upward in a direction toward the window panel 24, and a soundproof member 60 fixed to the upper end portion 52 of the interior material 50. The soundproof member 60 is provided in contact in a compressed state with an inner surface of the window panel 24 so as to fill a gap G formed between the upper end portion 52 of the interior material 50 and the window panel 24.

10 Claims, 7 Drawing Sheets

(56) References Cited

U.S. PATENT DOCUMENTS

| | | | |
|---|---|---|---|
| 7,766,389 B2* | 8/2010 | Odate | B60R 22/02 |
| | | | 280/806 |
| 10,000,111 B2* | 6/2018 | Makita | B60J 5/0402 |
| 11,241,946 B2* | 2/2022 | Yun | B60J 10/15 |
| 2002/0003356 A1* | 1/2002 | Davis | B60J 10/78 |
| | | | 296/146.16 |
| 2005/0052051 A1* | 3/2005 | Kohara | B60J 5/0418 |
| | | | 296/146.7 |
| 2006/0157890 A1* | 7/2006 | Amano | B29C 45/14434 |
| | | | 52/204.5 |
| 2018/0141601 A1* | 5/2018 | Koike | B60J 1/10 |
| 2019/0152419 A1* | 5/2019 | Tanaka | B60R 13/025 |

FOREIGN PATENT DOCUMENTS

| | | | |
|---|---|---|---|
| JP | H0737849 U | | 7/1995 |
| JP | 2008162594 A | * | 7/2008 |
| JP | 2014043215 A | | 3/2014 |
| JP | 2016052827 A | | 4/2016 |
| JP | 2017030673 A | | 2/2017 |

* cited by examiner

VEHICLE BODY SOUNDPROOF STRUCTURE

This application is based on and claims the benefit of priority from Chinese Patent Application No. CN202110334735.8, filed on 29 Mar. 2021, the content of which is incorporated herein by reference.

BACKGROUND OF THE INVENTION

Field of the Invention

The present invention relates to a vehicle body soundproof structure.

Related Art

In recent years, vehicles have undergone various improvements to reduce vehicle interior noise caused by the driving power (e.g., the engine or the motor), and in particular in electric vehicles, vehicle interior noise caused by the driving power is generally small.

However, vehicle interior noise includes not only noise caused by the driving power, but also noise caused by the sound of wind passing around the outside of a vehicle (so-called wind noise) and the sound and vibrations generated when the tires step on the road surface (so-called road noise) entering the vehicle interior.

A known technique for suppressing road noise entering a vehicle interior is disclosed, for example, in Patent Document 1, and is a vehicular soundproof structure employing a configuration wherein a sound absorption material (soundproof member) is attached to a back face of a trim member (interior material), the sound absorption material being provided in a space defined by the trim member (interior material) and the portion from the bottom side edge of the quarter window (window panel) to the side panel (inner side panel) and the wheelhouse (wheelhouse inner) in the vehicle body such that the sound absorption material is separated from the back face of the trim member and partially in contact with the wheelhouse inner.

Patent Document 1: Japanese Unexamined Patent Application, Publication No. 2017-30673

SUMMARY OF THE INVENTION

The vehicular soundproof structure described in Patent Document 1 adopts a configuration wherein the sound absorption material (soundproof member) is provided in contact with the wheelhouse, which is the origin of the spreading of road noise into the vehicle interior, and therefore, although the noise insulation performance allows for a certain degree of noise reduction, there is a problem in that there is a need to use an extremely large area (or volume) of sound absorption material in order to improve the noise insulation performance, which leads to increased material costs. Moreover, because the space between the interior material and the side panel and the wheelhouse is generally also a space equipped with electrical components such as sensors, switches, wire harnesses, etc., the available space for accommodating the sound absorption material in the space is naturally limited, and therefore, there is a problem in that efficient noise insulation performance cannot be achieved.

It is also expected that road noise will be propagated through the air entering the space formed between the side panel and the interior material through the gap between the mating surfaces of the wheelhouse outer and the wheelhouse inner constituting the wheelhouse, and that the air will pass further upward through a gap present between the side panel and the upper edge portion of the interior material and rise toward the quarter window (window panel) located toward the top of the vehicle body, thus allowing road noise inside the vehicle interior.

However, the vehicular soundproof structure described in Patent Document 1 takes no noise insulation measures whatsoever against road noise that passes through the gap present between the side panel and the upper edge portion of the interior material, and therefore, road noise entering the vehicle interior through the gap cannot be sufficiently suppressed. When road noise enters the vehicle interior through the gap, vehicle interior noise may easily occur, which may cause vehicle occupants discomfort, and thus improvements are desirable.

The present invention has been made in view of the above, and has an object of providing a vehicle body soundproof structure that effectively reduces the intrusion of road noise occurring in the wheelhouse into the vehicle interior using a relatively small amount (or volume) of soundproof member.

(1) In order to achieve the above object, the present invention provides a vehicle body soundproof structure for blocking noise from outside a vehicle, the vehicle body soundproof structure including: a window panel fixed in a window frame located on a side portion of a vehicle body; an interior material provided at a vehicle interior side of the window frame and having an upper end portion extending diagonally upward in a direction toward the window panel; and a soundproof member fixed to the upper end portion of the interior material, wherein the soundproof member is provided in contact in a compressed state with an inner surface of the window panel, so as to fill a gap formed between the upper end portion of the interior material and the window panel.

(2) In the vehicle body soundproof structure according to (1), the soundproof member may have a corner portion extending linearly in an extension direction of the soundproof member, the corner portion being in contact with the inner surface of the window panel in a vehicle width direction.

(3) In the vehicle body soundproof structure according to (1), the interior material may have a flange shape so that the upper end portion is bent toward the window panel.

(4) The vehicle body soundproof structure according to (1) may have an adhesion portion where the window frame and the window panel are adhered, the adhesion portion being provided at a lower location than a contact portion of the window panel and the soundproof member.

(5) In the vehicle body soundproof structure according to (4), a window frame hiding portion may be provided on the inside of the adhesion portion in the vehicle width direction so as to cover the window frame to not be visible from outside the vehicle interior, the soundproof member being in contact with the window frame hiding portion.

(6) In the vehicle body soundproof structure according to (4), an adhesive adhered to the adhesion portion may be bonded to the vehicle body in an uncured state.

(7) The vehicle body soundproof structure according to (1) may further include, between the upper end portion of the interior material and the soundproof member, a pedestal angled relative to the upper end portion of the interior material.

(8) In the vehicle body soundproof structure according to (1), the window frame may be provided at a rear side portion of the vehicle body.

(9) In the vehicle body soundproof structure according to (8), a belt winding device for protecting an occupant may be provided in the vehicle interior at an upper location further rearward than the window frame, an upper end of the interior material being located further upward than a shoulder strap line extending diagonally downward from the belt winding device.

(10) In the vehicle body soundproof structure according to (1), the window frame may be provided at a front side portion of the vehicle body.

According to the present invention, it is possible to provide a vehicle body soundproof structure that can effectively reduce road noise occurring inside the wheelhouse with a relatively small amount (or volume) of noise insulating material, and to inexpensively improve quietness in the vehicle.

DETAILED DESCRIPTION OF THE INVENTION

A number of embodiments of the present invention are described with reference to the drawings.

Figure 1:
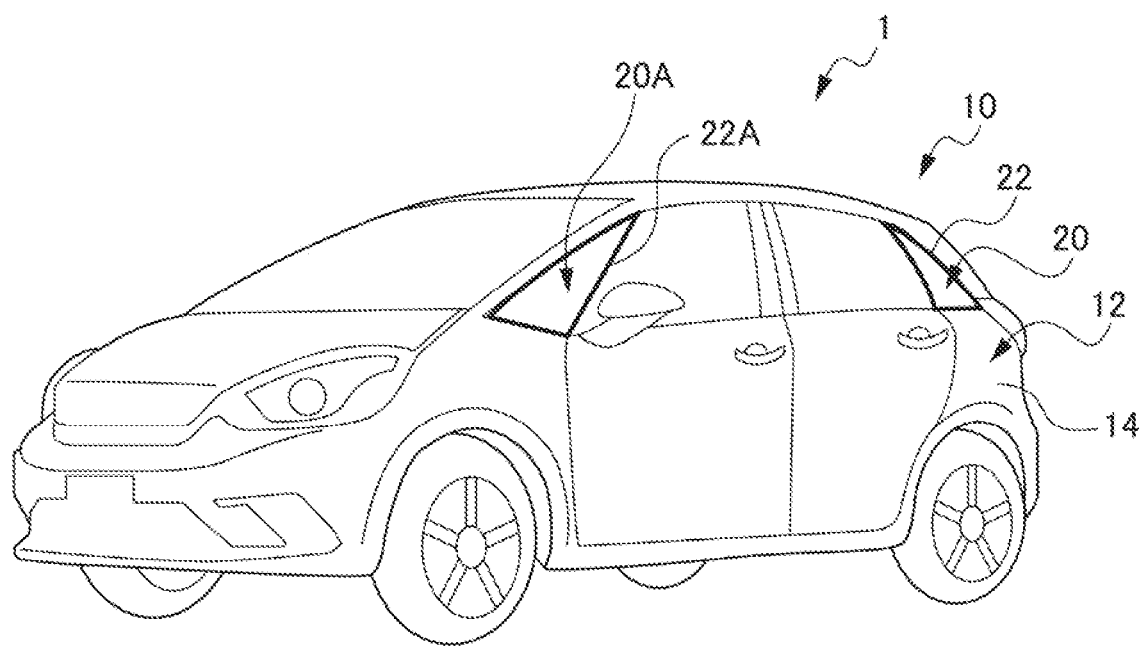
FIG. 1 is a perspective view of a vehicle provided with a vehicle body soundproof structure according to an embodiment of the present invention.
Figure 2:
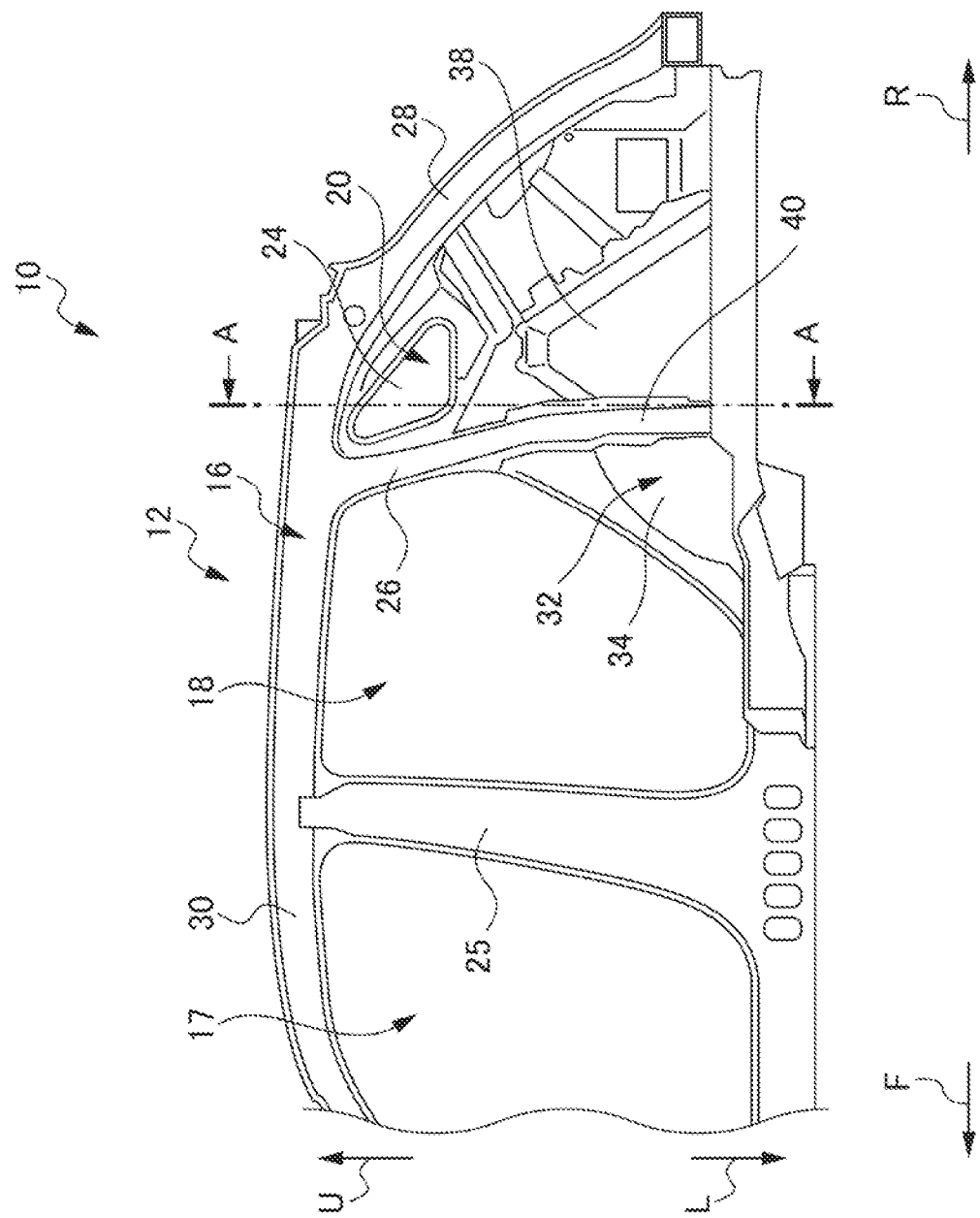
FIG. 2 is a schematic front view of a side panel constituting a right-side portion of the vehicle illustrated in FIG. 1 as seen from the side where an interior material is attached (inside in a vehicle width direction)
Figure 3:
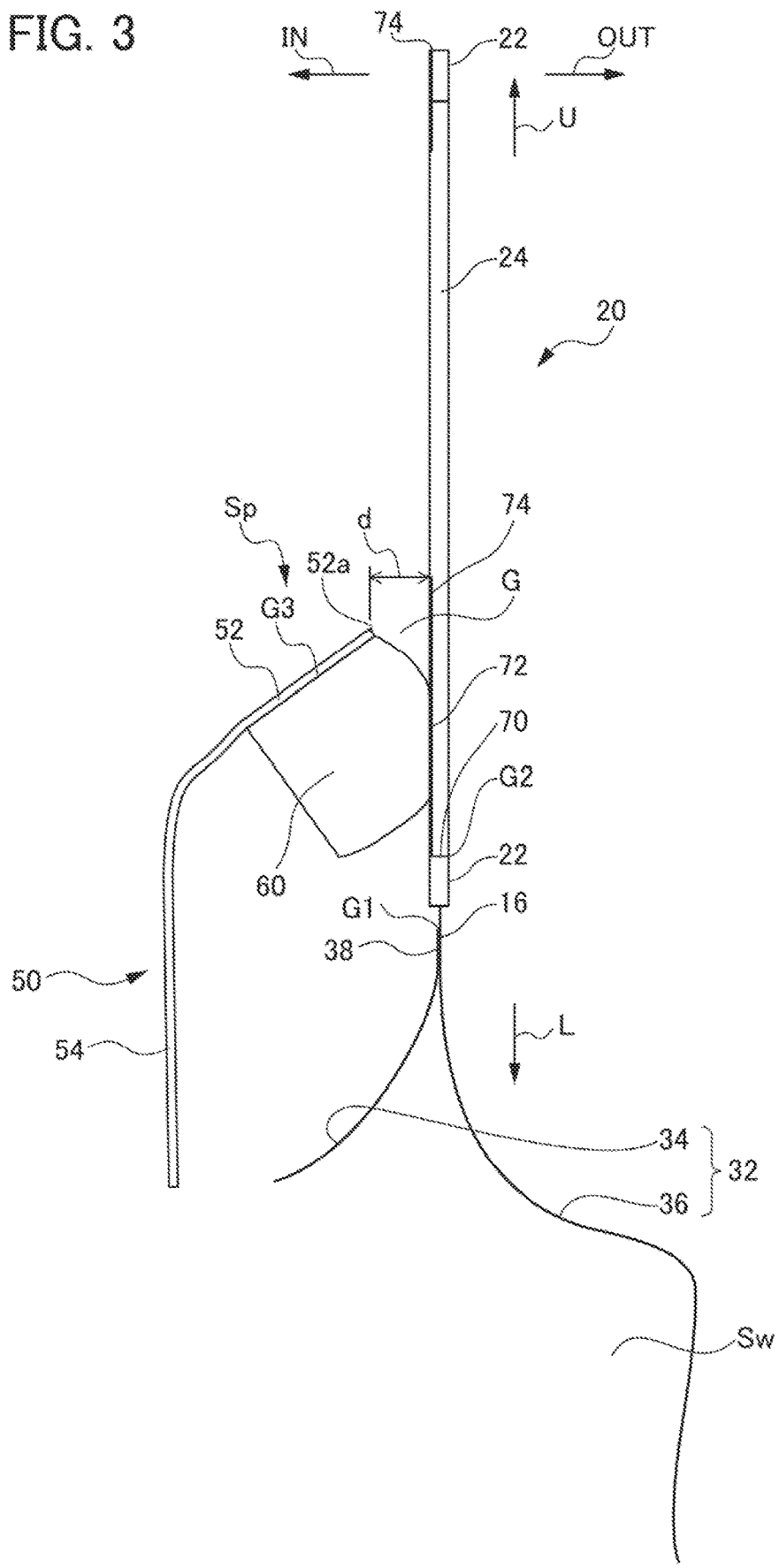
FIG. 3 is a cross-sectional view taken along line A-A shown in FIG. 2, illustrating a state after a window panel has been fixed in a window frame and after the interior material with a soundproof member fixed thereto has been attached to (a side panel inner constituting) the vehicle body.

FIG. 1 is a perspective view of a vehicle provided with a vehicle body soundproof structure according to an embodiment of the present invention, FIG. 2 is a schematic front view of a side panel constituting a right-side portion of the vehicle illustrated in FIG. 1 as seen from the side where an interior material is attached (inside in a vehicle width direction), and FIG. 3 is a cross-sectional view taken along line A-A in FIG. 2, illustrating a state after a window panel has been fixed in a window frame and after the interior material with a soundproof member fixed thereto has been attached to the side panel. In the drawings, 1 denotes a vehicle, 10 denotes a vehicle body, 12 denotes a side panel, 24 denotes a window panel, 50 denotes an interior material, and 60 denotes a soundproof member.

In a vehicle body soundproof structure Sp according to the present embodiment, the vehicle body 10 of the vehicle 1 includes the side panel 12 constituting a side portion (the left-side portion of the vehicle in FIG. 1) of the vehicle 1, and the side panel 12 has a side panel outer 14 constituting a side face (the left-side face in FIG. 1) of the vehicle 1, and a side panel inner (a side panel 16 constituting the right side portion of the vehicle 1 in FIG. 2) located on the inside IN in a vehicle width direction relative to the side panel outer 14 and being joined to and fixed to the side panel outer 14.

The vehicle body 10 is provided with a quarter window 20 at an upper portion of the side portion further in a vehicle rearward direction R than a rear door opening 18. The quarter window 20 is a fixed window that cannot be opened or closed, constituted by a window panel 24 fitted and fixed in a window frame 22 formed in the side portion of the vehicle body 10.

This kind of quarter window 20 is adopted in many vehicles from the viewpoint of ensuring visibility and design, and in the vehicle illustrated in FIG. 1, a case is shown in which a quarter window is provided at locations both at the rear side portion and the front side portion of the vehicle body 10 (the locations of two window frames 22, 22A indicated by thick lines in FIG. 1). It should be noted that although the vehicle 1 illustrated in FIG. 1 has quarter windows 20, 20A formed as approximately triangular windows, the shape of the quarter windows 20, 20A is not particularly limited, and various shapes may be adopted, such as a rectangle, a trapezoid, etc.

At a location on the front side and the rear side of the vehicle that sandwich the quarter window 20, there is respectively provided a C-pillar 26 and a D-pillar 28, which extend in the vertical direction of the vehicle body 10. In addition, at a location between a front door opening 17 and a rear door opening 18, there is provided a B-pillar 25 extending in the vertical direction of the vehicle body 10, and the upper ends of the B-pillar 25, the C-pillar 26, and the D-pillar 28 are all connected to a roof side rail 30 extending in the front-rear direction of the vehicle.

In addition, at a location further in the downward direction L of the vehicle than the quarter window 20, there is provided a wheelhouse 32 having an inside space Sw for housing a wheel (the rear right wheel in FIG. 2) of the vehicle 1.

As illustrated in FIG. 3, the wheelhouse 32 is constituted by a wheelhouse inner 34 located on the inside IN in a vehicle width direction, and a wheelhouse outer 36 located on the outside OUT in the vehicle width direction. An upper end portion of the wheelhouse inner 34 is fixed and connected to the wheelhouse outer 36 such that the respective inner faces thereof (opposing faces) are in contact with each other to form a mating surface 38. In addition, an upper end portion of the wheelhouse outer 36 extends further in a vehicle upward direction U from the location of the mating surface 38 with the wheelhouse inner 34 and is fixed and connected to the side panel 16. Meanwhile, a lower end portion of the wheelhouse outer 36 is fixed and connected to a lower end portion of the side panel outer 14.

As illustrated in FIG. 2, at a central portion in the vehicle front-rear direction of the wheelhouse inner 34, there is provided a suspension housing 38. At a vehicle front side of the suspension housing 38 in the wheelhouse inner 34, there is provided a gusset 40 to reinforce the lower side portion of the C-pillar 26.

As illustrated in FIG. 3, the vehicle body soundproof structure Sp according to the present embodiment also includes a window panel 24 mainly constituting the quarter window 20, an interior material 50, and a soundproof member 60.

The window panel 24 is fixed in the window frame 22 in the side portion of the vehicle body 10 and constitutes the quarter window 20. The material of the window panel 24 is not particularly limited, and examples thereof include glass, polycarbonate (PC) resin, metal, etc.

The interior material 50 is provided to the vehicle interior side IN of the side panel inner 16, and is a lining made of resin constituting a wall surface of the vehicle interior.

The soundproof member 60 is arranged as a sub-assembly fixed on a back face of an upper end portion 52 of the interior material 50. The soundproof member need only be able to reduce noise, and may be composed of a sound absorption material, a sound blocking material, or a composite of sound absorption material and sound blocking material. For example, a plastic foam (sponge) such as urethane foam or the like is preferably used as the soundproof member. The method for fixing the soundproof member 60 to the back face of the upper end portion 52 of the interior material 50 is not particularly limited, and examples thereof include the use of double-sided tape, acrylic foam, ultrasonic welding, clips, heat bonding, adhesion using an adhesive, etc.

The inventor of the present invention has reviewed for reducing road noise entering the vehicle interior by passing through a gap G1 in the mating surface 38 of the wheelhouse outer 36 and the wheelhouse inner 34 and a gap G2 in the mating surface of the window frame 22 and the window panel 24, further passing through a gap G present between the side panel inner 16 and the upper end portion 52 of the interior material 50, and moving it upward toward the window panel 24 of the quarter window 20 located at a vehicle upper side U.

First, it was found that when the upper end portion 52 of the interior material 50 is bent at a right angle (about 90 degrees) relative to a main portion 54 of the interior material 50 and made to extend approximately horizontally, as in a usual interior material shape, the soundproof member 60 fixed to the back face of the upper end portion 52 of the interior material 50 will be arranged facing down, and therefore it is difficult to arrange the soundproof member 60 so as to protrude from the location of an upper end 52a of the interior material 50 toward the side panel inner 16.

In addition, when the interior material 50 is configured such that the upper end portion 52 extends approximately horizontally, filling the gap G present between the side panel inner 16 and an upper end 52a of the interior material 50 with the soundproof member 60 requires an arrangement so that the upper end 52a of the interior material 50 is in contact with the inner surface of the side panel inner 16 in a positional relationship in which the extension direction of the upper end portion 52 of the interior material 50 and the inner surface of the side panel inner 16 are orthogonal to each other.

However, even if the interior material 50 is attached such that its upper end 52a is in contact with the inner surface of the side panel inner 16, the soundproof member 60 may not be in contact (close contact) with the inner surface of the side panel inner 16, in which case There was a risk that sound leakage would occur through the gap G and road noise would enter the vehicle interior.

After further reviewing for reducing road noise entering through the gap G, the inventor has found that by having the soundproof member 60 fixed to the back face of the upper end portion 52 of the interior material 50 be arranged not to be in contact with the inner surface of the side panel inner 16, but to be in contact with the inner surface of (the lower end portion of) the window panel 24, and by having the upper end portion 52 of the interior material 50 be bent in a blunt angle, which is an angle greater than a right angle (preferably 100 to 170 degrees) relative to the main portion 54 of the interior material 50 and extend diagonally upward in a direction toward the window panel 24, it is possible to arrange the soundproof member 60 fixed to the back face of the upper end portion 52 of the interior material 50 to protrude from the location of the upper end 52a of the interior material 50 toward the inner surface of the window panel 24. As this result, even if the interior material 50 is attached to the side panel inner 16 in a positional relationship wherein the gap G is left between the upper end 52a of the interior material 50 and the inner surface of the window panel 24, the soundproof member 60 is sandwiched and pressed between the upper end portion 52 of the interior material 50 and the inner surface of the window panel 24, allowing for the soundproof member 60 to be arranged in a compressed state in contact (close contact) with the inner surface of the window panel 24, making it possible to reliably fill the gap G formed between the upper end portion 52 of the interior material 50 and the inner surface of the window panel 24 with the soundproof member 60, and, as a result, allows for an effective reduction of road noise occurring inside the wheelhouse 32 entering the vehicle interior.

Further, by extending the upper end portion 52 of the interior material 50 with an upward inclination, the gap G between the interior material 50 and the window panel 24 can be made as small as possible while improving the appearance, making it possible to inexpensively improve quietness by using a relatively small amount (or volume) of soundproof member 60.

Figure 4:
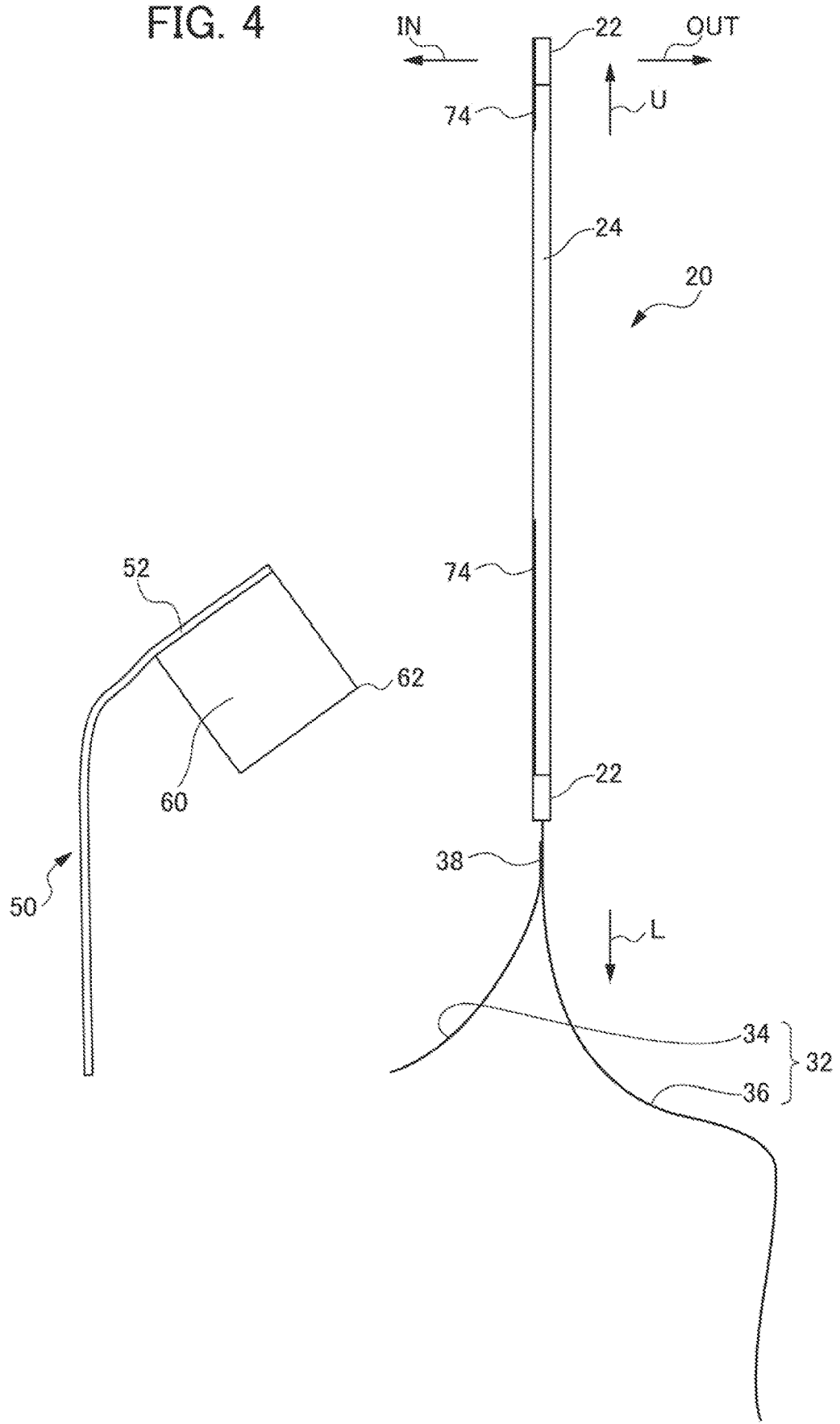
FIG. 4 is a cross-sectional view taken along line A-A shown in FIG. 2, illustrating a state after a window panel has been fixed in a window frame and before the interior material with a soundproof member fixed thereto is attached to (a side panel inner constituting) the vehicle body.

The soundproof member 60 has a shape extending continuously in the same direction as the extension direction (a direction perpendicular to the drawing surface of FIG. 3) of the gap G between the interior material 50 and the window panel 24. Further, the soundproof member 60 has a corner portion 62 extending linearly along the extension direction of the soundproof member 60 (see FIG. 4), which corner portion 62 is preferably made to contact the inner surface of the window panel 24 in the vehicle width direction. This makes it easy for the corner portion 62 of the soundproof member 60 to be compression-deformed with respect to the inner surface of the window panel 24 as shown in FIG. 3, thereby forming a compression deformed contact portion 72, making it possible to reliably seal the gap G. Accordingly, road noise is reliably prevented from entering the vehicle interior through the gap G2 present in the mating surface of the window frame 22 and the window panel 24.

The soundproof member 60 is preferably of a lower strength than the adhesive used to bond the window panel 24 to the window frame 22 (for example, a strength in a state before the adhesive is cured (an uncured state)). When the interior material 50 is attached to the side panel 12, if the upper end portion 52 of the hard interior material 50 is pressed against the window panel 24, the window panel 24 may be peeled off. Therefore, it is preferable that the gap G with a predetermined distance d (preferably 3 to 6 mm) is established between the interior material 50 and the window panel 24, and that they are provided spaced apart enough to prevent them from impinging on each other even if the distance varies slightly.

In addition, the interior material 50 preferably has a flanged shape in which the upper end portion 52 is bent so as to extend diagonally upward toward the window panel 24. As the soundproof member 60 will thus be provided to the diagonally upward flange, it allows for a gap G3 present between the interior material 50 and the soundproof member 60 to be reliable sealed. Accordingly, road noise can be reliably prevented from entering the vehicle interior through the gap G present between the interior material 50 and the window panel 24.

Further, it is preferable that the window frame 22 and the window panel 24 have an adhesion portion 70 where they are adhered and that adhesion portion 70 is provided at a lower location than the contact portion 72 of the window panel 24 and the soundproof member 60. This causes the gap G2 present in the mating surface of the window panel 24 and the window frame 22 to be filled by the adhesion portion 70, so that the intrusion of rainwater from the gap G2 into the vehicle interior can be reliably suppressed. Therefore, it is possible to suppress the deterioration of the performance of the soundproof member 60 due to being immersed in water.

Figure 5:
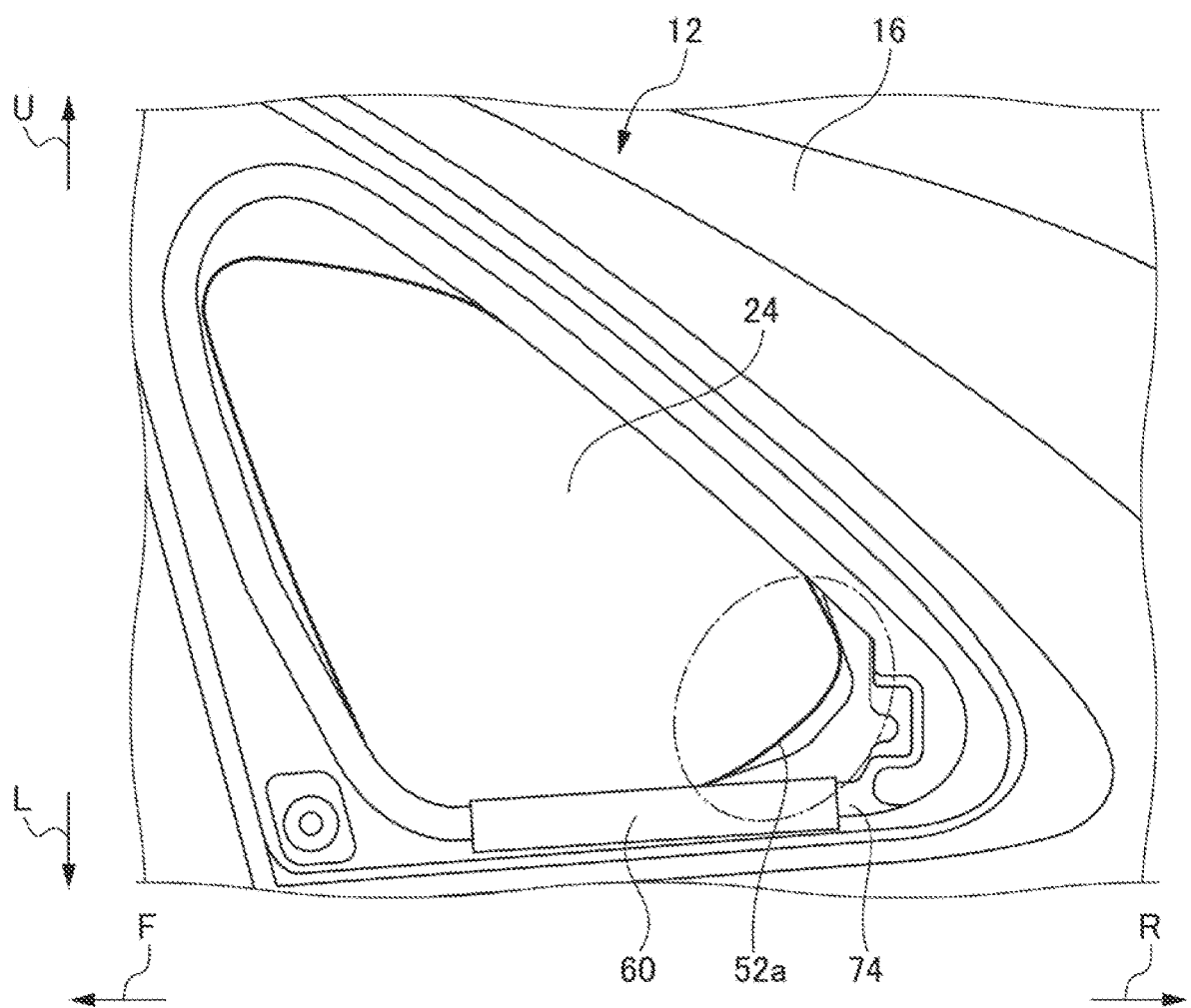
FIG. 5 is an enlarged view of the state in which the window panel is fixed in the window frame as illustrated in FIG. 2, in order to illustrate the positional relationship of the window panel, the soundproof member, and (the upper end of) the interior material.

A window frame hiding portion 74 is provided on the inside IN of the adhesion portion 70 in the vehicle width direction so that the window frame 22 is not visible from outside the vehicle, and the soundproof member 60 may be in contact with the window frame hiding portion 74, as shown in FIG. 3. It is thus possible to make the soundproof member 60, the upper end portion of the interior material, and the harness not be visible from outside the vehicle. Accordingly, the degree of freedom in design is increased, and the soundproof member 60 can be provided in various parts (such as the front side surface or the rear side surface). FIG. 5 is an enlarged view of the state in which the window panel 24 as shown in FIG. 2 is fixed, and illustrates the positional relationship of the window panel 24, the soundproof member 60, and (the upper end 52a of) the interior material 50.

The adhesive adhered to the adhesion portion 70 is preferably bonded to the vehicle body 10 in an uncured state. Because it is bonded to the vehicle body 10 in an uncured state, productivity is improved. Accordingly, both productivity and noise insulation performance can be achieved.

Figure 6:
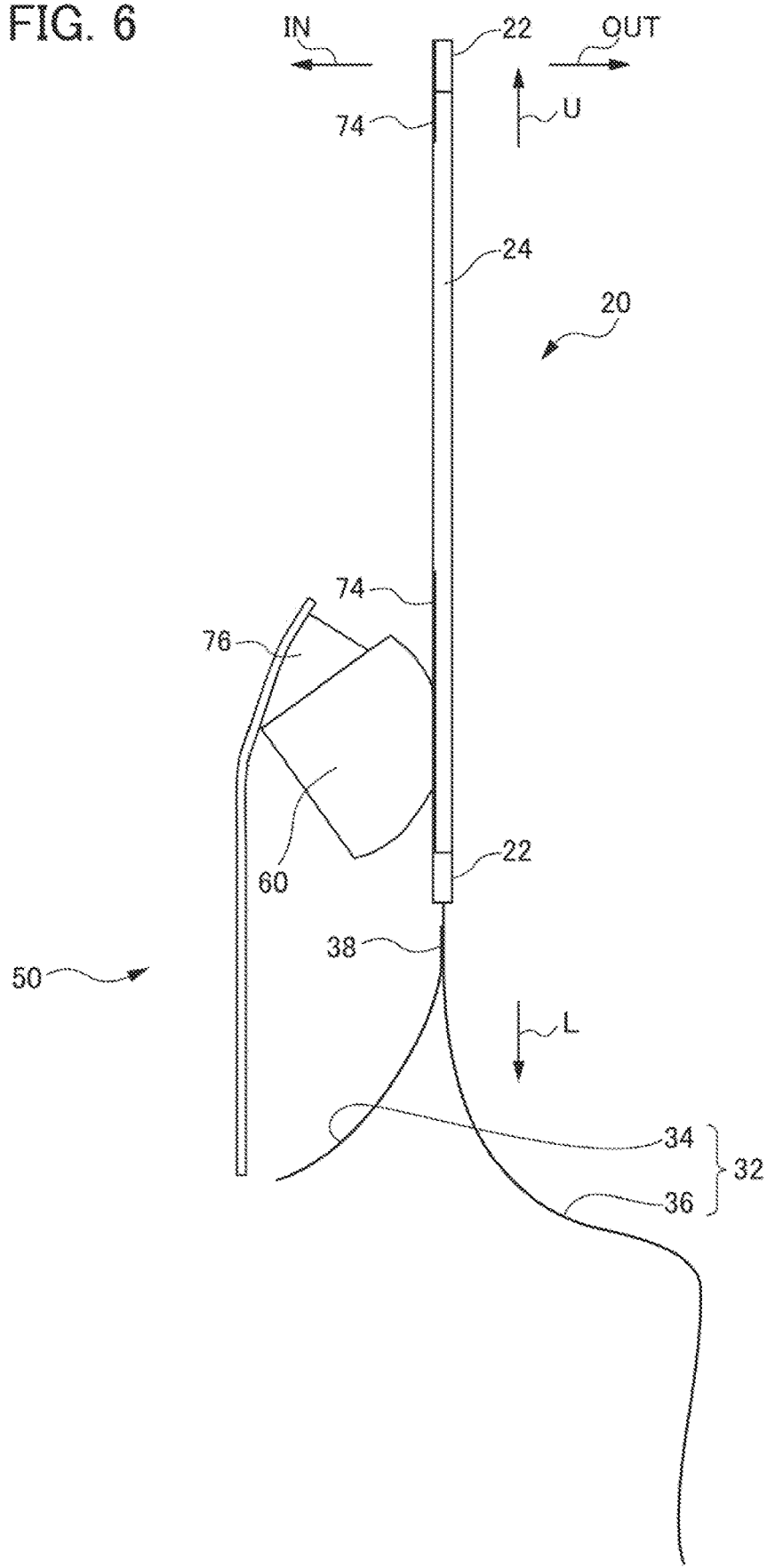
FIG. 6 illustrates a vehicle body soundproof structure according to another embodiment of the present invention, and is a cross-sectional view taken along a line identical to line A-A shown in FIG. 2.

FIG. 6 shows a vehicle body soundproof structure according to another embodiment of the present invention, and is a cross-sectional view taken along a line identical to line A-A shown in FIG. 2. In the embodiment shown in FIG. 6, a pedestal 76 angled relative to the upper end portion 52 of the interior material 50 may further be provided between the upper end portion 52 of the interior material 50 and the soundproof member 60. Because the angular relationship with the soundproof member 60 due to changes in the inclination angle of the upper end portion 52 of the interior material 50 (identical to the curve angle relative to the main portion 54 of the interior material 50) is adjusted by the pedestal 76, the soundproof member 60 can reliably be in contact in a compressed state with the inner surface of the window panel 24. In addition, even with the soundproof member 60 provided, visibility from the vehicle interior (the quarter window 20 looks large without hiding its lower part) is not impaired. This configuration is preferably adopted in a case where the upper end portion 52 of the interior material 50 cannot be largely bent relative to the main portion 54 of the interior material 50 due to problems such as the appearance of the design, etc.

The window frame 22 (22A) in which the window panel 24 is fixed at a side portion of the vehicle body 10 is provided at least one of the front side portion and the rear side portion of the vehicle body 10. This allows for a reduction of noise from the front or rear side portion of the vehicle body 10. Accordingly, by providing the vehicle body soundproof structure according to the present embodiment to the front side portion of the vehicle body 10, road noise can be prevented from entering the vehicle interior through the front side portion of the vehicle body 10. Likewise, by providing the vehicle body soundproof structure according to the present embodiment to the rear side portion of the vehicle body 10, road noise can be prevented from entering the vehicle interior from the wheelhouse 32 side housing the rear wheel of the vehicle body 10.

Figure 7:
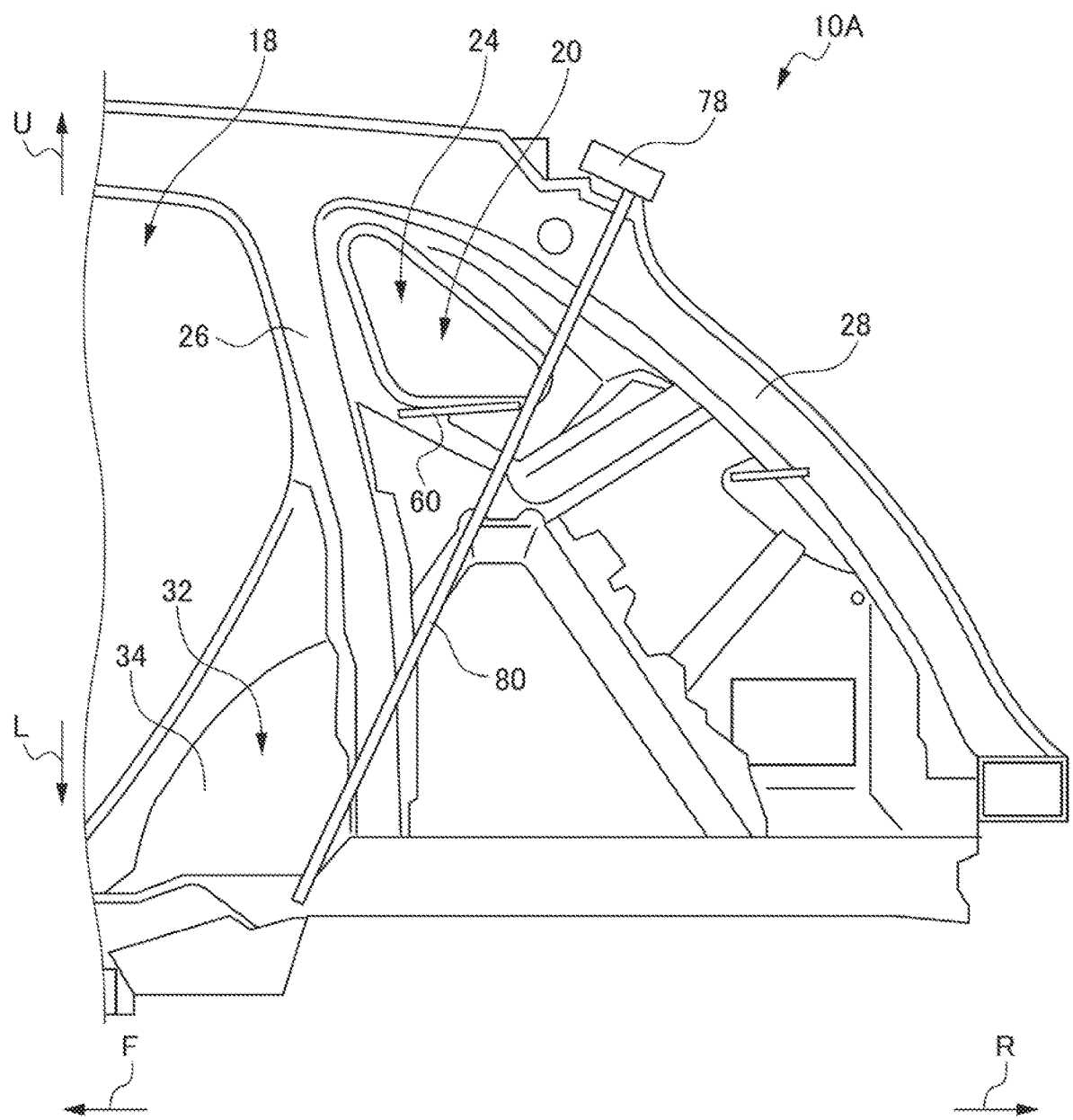
FIG. 7 illustrates a vehicle body soundproof structure according to another embodiment of the present invention, and is an enlarged schematic front view of a right-side rear portion of a vehicle, in order to illustrate the positional relationship of a window panel, a soundproof member, and a shoulder strap line.

FIG. 7 shows a vehicle body soundproof structure according to another embodiment of the present invention, and is an enlarged schematic front view of a right-side rear portion of a vehicle, in order to illustrate the positional relationship of a window panel 24, a soundproof member 60, and a shoulder strap line 80. When the vehicle body soundproof structure according to the present embodiment is provided to the rear side portion of the vehicle body 10A, it is preferable that a belt winding device 78 for protecting an occupant is provided in the vehicle interior and at an upper location further rearward than a window frame 22, and that an upper end 52a of an interior material 50 is located above the shoulder strap line (belt line) 80 extending diagonally downward from the belt winding device 78 (toward the vehicle front). Visibility is thus not impaired by the shoulder strap 80. Accordingly, even if the belt winding device 78 is provided, visibility is not impaired.

The present embodiment exhibits the following effects. The vehicle body soundproof structure Sp according to the present embodiment includes a window panel 24 fixed in a window frame 22 located on a side portion of a vehicle body 10; an interior material 50 provided at a vehicle interior side IN of the window frame 22 and having an upper end portion 52 extending diagonally upward in a direction toward the window panel 24; and a soundproof member 60 fixed to the upper end portion 52 of the interior material 50. The soundproof member 60 is provided in contact in a compressed state with an inner surface of the window panel 24, so as to fill a gap G formed between the upper end portion 52 of the interior material 50 and the window panel 24. By adopting these features, the gap G present between the interior material 50 and the window panel 24 can be made as small as possible while improving appearance, and thus road noise occurring inside the wheelhouse 32 can be effectively reduced with a relatively small amount (or volume) of soundproof member 60, whereby quietness inside the vehicle is inexpensively improved.

Further, in the vehicle body soundproof structure Sp according to the present embodiment, the soundproof member 60 has a corner portion 62 extending linearly in an extension direction of the soundproof member 60, the corner portion 62 being in contact with the inner surface of the window panel 24 in a vehicle width direction. This makes it easy for the corner portion 62 of the soundproof member 60 to be compression-deformed by the inner surface of the window panel 24, making it possible to reliably seal the gap G. Accordingly, road noise is reliably prevented from entering the vehicle interior through the gap G2 present in the mating surface of the window frame 22 and the window panel 24.

Further, in the vehicle body soundproof structure Sp according to the present embodiment, the interior material 50 has a flange shape so that the upper end portion 52 is bent toward the window panel 24. The soundproof member 60 will thus be provided to the diagonally upward flange, allowing for the gap G3 present between the interior material 50 and the soundproof member 60 to be reliable sealed. Accordingly, road noise can be reliably prevented from entering the vehicle interior through the gap G present between (the upper end portion 52 of) the interior material 50 and the window panel 24.

Further, the vehicle body soundproof structure Sp according to the present embodiment has an adhesion portion 70 where the window frame 22 and the window panel 24 are adhered, the adhesion portion 70 being provided at a lower location than a contact portion 72 of the window panel 24 and the soundproof member 60. This causes the gap G2 in the mating surface of the window panel 24 and the window frame 22 to be filled by the adhesion portion 70, resulting in reliable reduction of rainwater from entering the vehicle interior through the gap G2. Accordingly, it is possible to suppress the deterioration of the performance of the soundproof member 60 due to being immersed in water.

Further, in the vehicle body soundproof structure Sp according to the present embodiment, a window frame hiding portion 74 is provided on the inside IN of the adhesion portion 70 in the vehicle width direction such that the window frame 22 is covered to not be visible from outside the vehicle, and the soundproof member 60 is in contact with the window frame hiding portion 74. The soundproof member 60 can thus be provided so as not to be visible from outside the vehicle. Accordingly, the degree of freedom in design is increased, and the soundproof member 60 can be provided in various parts (such as the front side surface or the rear side surface).

Further, in the vehicle body soundproof structure Sp according to the present embodiment, an adhesive adhered to the adhesion portion 70 is constituted so as to be bonded to the vehicle body 10 in an uncured state. Because it is bonded to the vehicle body 10 in an uncured state, productivity is improved. Accordingly, both productivity and noise insulation performance can be achieved.

Further, the vehicle body soundproof structure Sp according to the present embodiment further includes a pedestal 76 between the upper end portion 52 of the interior material 50 and the soundproof member 60. Because the angular relationship with the soundproof member 60 due to changes in the inclination angle of the upper end portion 52 of the interior material 50 is adjusted by the pedestal 76, the soundproof member 60 can reliably be in contact in a compressed state with the inner surface of the window panel 24. In addition, even with the soundproof member 60 provided, visibility from the vehicle interior (the quarter window 20 looks large without hiding its lower part) is not impaired.

Further, in the vehicle body soundproof structure Sp according to the present embodiment, the window frame 22 in the side portion of the vehicle body 10 in which the window panel 24 is fixed is constituted so as to be provided at a rear side portion of the vehicle body 10. This makes it possible to prevent road noise from entering the vehicle interior from the wheelhouse 32 side housing the rear wheel of the vehicle body 10.

Further, in the vehicle body soundproof structure Sp according to the present embodiment, a belt winding device 78 for protecting an occupant is provided in the vehicle interior at an upper location further rearward than the window frame 22, an upper end 52a of the interior material 50 being located further upward than a shoulder strap line 80 extending diagonally downward from the belt winding device 78. Visibility is thus not impaired by the shoulder strap. Accordingly, even if the belt winding device 78 is provided, visibility is not impaired.

Further, in the vehicle body soundproof structure Sp according to the present embodiment, the window frame 22A is constituted so as to be provided at a front side portion of the vehicle body. Road noise can thus be prevented from entering the vehicle interior through the front side portion of the vehicle body 10.

It should be noted that the present invention is not limited to the above embodiments, and that various modifications and improvements within the scope of achieving the object of the invention are included in the present invention.

EXPLANATION OF REFERENCE NUMERALS

1 Vehicle
10 Vehicle body
12 Side panel
14 Side panel outer
16 Side panel inner
18 Rear door opening
20, 20A Quarter window
22, 22A Window frame
24 Window panel
25 B-pillar
26 C-pillar
28 D-pillar
30 Roof siderail
32 Wheelhouse
34 Wheelhouse inner
36 Wheelhouse outer
38 Mating surface
40 Gusset
50 Interior material
52 Upper end portion of interior material
54 Main body of interior material
60 Soundproof member
62 Corner portion of soundproof member
70 Adhesion portion
72 Contact portion
74 Window frame hiding portion
76 Pedestal
78 Belt winding device
80 Shoulder strap line (belt line)
d Distance of the gap G
G, G1, G2, G3 Gap
Sp Vehicle body soundproof structure
Sw Inside space of wheelhouse

What is claimed is:

1. A vehicle body soundproof structure for blocking noise from outside a vehicle, the vehicle body soundproof structure comprising:
    a window panel fixed in a window frame located on a side portion of a vehicle body;
    an interior material provided at a vehicle interior side of the window frame and having an upper end portion extending diagonally upward in a direction toward the window panel; and
    a soundproof member fixed to the upper end portion of the interior material,
    wherein
    the soundproof member is provided in contact in a compressed state with an inner surface of the window panel, so as to fill a gap formed between the upper end portion of the interior material and the window panel.

2. The vehicle body soundproof structure according to claim 1, wherein the soundproof member has a corner portion extending linearly in an extension direction of the soundproof member, the corner portion being in contact with the inner surface of the window panel in a vehicle width direction.

3. The vehicle body soundproof structure according to claim 1, wherein the interior material has a flange shape so that the upper end portion is bent toward the window panel.

4. The vehicle body soundproof structure according to claim 1, having an adhesion portion where the window frame and the window panel are adhered,
the adhesion portion being provided at a lower location than a contact portion of the window panel and the soundproof member.

5. The vehicle body soundproof structure according to claim 4, wherein a window frame hiding portion is provided on the inside of the adhesion portion in the vehicle width direction so as to cover the window frame to not be visible om outside the vehicle interior, and
the soundproof member is in contact with the window frame hiding portion.

6. The vehicle body soundproof structure according to claim 4, wherein an adhesive adhered to the adhesion portion is bonded to the vehicle body in an uncured state.

7. The vehicle body soundproof structure according to claim 1, further comprising, between the upper end portion of the interior material and the soundproof member, a pedestal angled relative to the upper end portion of the interior material.

8. The vehicle body soundproof structure according to claim 1, wherein the window frame is provided at a rear side portion of the vehicle body.

9. The vehicle body soundproof structure according to claim 8, wherein a belt winding device for protecting an occupant is provided in the vehicle interior and at an upper location further rearward than the window frame, and
an upper end of the interior material is located further upward than a shoulder strap line extending diagonally downward from the belt winding device.

10. The vehicle body soundproof structure according to claim 1, wherein the window frame is provided at a front side portion of the vehicle body.

* * * * *